US008957743B2

(12) United States Patent
Reuter

(10) Patent No.: US 8,957,743 B2
(45) Date of Patent: Feb. 17, 2015

(54) INTEGRATED CIRCUIT, COMMUNICATION UNIT AND METHOD FOR PHASE COMPENSATION

(75) Inventor: Ralf Reuter, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 910 days.

(21) Appl. No.: 13/124,961

(22) PCT Filed: Nov. 18, 2008

(86) PCT No.: PCT/IB2008/054833
§ 371 (c)(1),
(2), (4) Date: Apr. 19, 2011

(87) PCT Pub. No.: WO2010/058244
PCT Pub. Date: May 27, 2010

(65) Prior Publication Data
US 2011/0205105 A1  Aug. 25, 2011

(51) Int. Cl.
*H03H 11/20* (2006.01)
*H01P 1/18* (2006.01)
*G01S 7/35* (2006.01)
*G01S 7/03* (2006.01)

(52) U.S. Cl.
CPC *G01S 7/038* (2013.01); *G01S 7/354* (2013.01)
USPC ............................................. 333/18; 333/156

(58) Field of Classification Search
CPC ........ H01P 1/184; H03H 11/20; H03H 11/26; H03L 7/0995; G01S 7/354; G01S 7/38
USPC ............................................. 333/18, 138, 156
See application file for complete search history.

(56) References Cited

U.S. PATENT DOCUMENTS

| 6,191,735 B1* | 2/2001 | Schineller | 342/375 |
| 6,580,304 B1* | 6/2003 | Rieven | 327/276 |
| 6,825,800 B1 | 11/2004 | Dudley et al. | |
| 6,906,601 B2* | 6/2005 | Fayyaz | 333/156 |
| 7,053,732 B2* | 5/2006 | Zhou | 333/156 |
| 7,324,042 B2* | 1/2008 | Werntz et al. | 342/174 |
| 8,054,876 B2* | 11/2011 | Tsai | 375/233 |
| 8,059,706 B2* | 11/2011 | Rofougaran | 375/230 |
| 2009/0262796 A1* | 10/2009 | Wada | 375/232 |

FOREIGN PATENT DOCUMENTS

| JP | 07-12928 | 1/1995 |
| JP | 11-004147 | 1/1999 |
| JP | 2003-270334 | 9/2003 |
| JP | 2003534673 B2 | 11/2003 |
| WO | 01/35529 A | 5/2001 |
| WO | 0135529 A2 | 5/2001 |
| WO | WO 2008029643 A1 * | 3/2008 |

OTHER PUBLICATIONS

International Search Report and Written Opinion correlating to PCT/IB2008/054833 dated Sep. 15, 2009.

* cited by examiner

*Primary Examiner* — Dean O Takaoka
*Assistant Examiner* — Alan Wong

(57) ABSTRACT

A communication unit comprises a controller and a radio frequency signal path having a plurality of delay elements operably coupled to a series of respective amplifier stages, wherein the controller is arranged to individually enable the respective amplifier stages. In response thereto a number of the plurality of delay elements are selectively inserted into or by-passed from the radio frequency signal path thereby adjusting a phase shift applied to signals provided through the radio frequency signal path.

20 Claims, 5 Drawing Sheets

FIG. 1 -
Prior Art
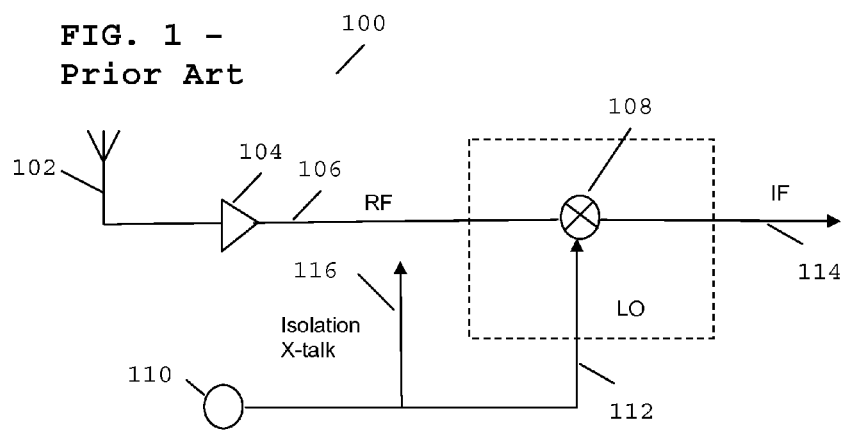
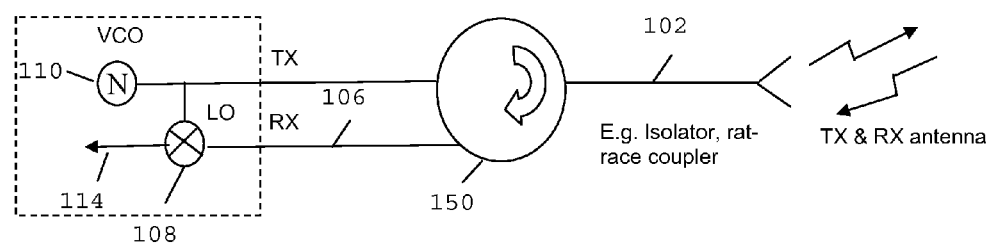

INTEGRATED CIRCUIT, COMMUNICATION UNIT AND METHOD FOR PHASE COMPENSATION

FIELD OF THE INVENTION

The field of this invention relates to phase compensation of signals in a communication unit. The field of the invention is applicable to, but not limited to, an integrated circuit for a communication unit that is suitable for use in a mono-static radar system.

BACKGROUND OF THE INVENTION

RAdio Detection And Ranging, often referred to as Radar, is a technology that has been increasingly used in many vehicular applications, such as in adaptive cruise control, sensor-based applications, etc. A radar system is an electronic system designed to transmit radio signals and receive reflected images of those signals from a 'target' object, in order to determine the bearing and distance to the 'target'. In future, vehicle manufacturers have suggested that vehicle radar systems may additionally be employed in safety related applications, such as: determination of a vehicle starting and/or stopping, to perform pre-cash detection and potentially to instigate emergency braking, etc. One example of radar technology that has been proposed for vehicular applications uses mono-static radar technology arranged to operate in the 77 GHz frequency range.

Integrated circuits (ICs) and/or communication units arranged to utilise radar technology require transceiver chips, or separate transmitter and receiver circuits to be located in close proximity to one another to improve the accuracy in determining a distance and bearing to the object. As a consequence, and particularly at typical radar frequencies where the transmit (and therefore receive) frequency is very high, such as in the 77 GHz frequency region, it is known that mono-static radar technology suffers from interference caused by poor isolation between the transmitted and received signals at these very high frequencies within the ICs or communication units.

FIG. 1 schematically illustrates known causes of interference effects in a high frequency communication unit 100. The high frequency communication unit 100 is illustrated with respect to a receiving operation, whereby an antenna 102 receives high frequency signals and passes them to a low noise amplifier 104. Depending on the receiver design and system requirements, the low noise amplifier is optional and can be also bypassed. The received and perhaps amplified high frequency signal 106 is input to a down-converting mixer 108, which down-converts the amplified signal 106 by multiplying it with a local oscillator (LO) signal 112 that is fed from an LO source 110. The output from the down-converting mixer 108 is a desired intermediate frequency (IF) signal 114, which is typically at a very much lower frequency, such that low-pass or band-pass filtering can be used to remove or attenuate undesired signals in the frequency domain. The IF signal may be a low frequency (LF) signal, a very low IF (VLIF) signal or even a DC (zero IF) signal. As shown, and particularly with high radio frequency (RF) signals, the signals may be undesirably radiated to nearby circuits/elements/transmission lines, etc. Thus, it is known that LO signals may radiate directly onto the receiver path, thereby causing interference. This interference is known as cross-talk interference or isolation cross-talk.

As a consequence, in order to reduce the level of interference that is radiated between internal circuits/elements/transmission lines, etc., many radar systems use ultra short transmit pulses to guarantee that the transmitter is shut-down (and therefore the transmitter oscillator signal is highly isolated from antenna) when the echo of the ultra short pulse is expected at the radar receiver. Alternatively, or additionally, radar systems may use spatially-separated antennas for the respective transmit or receive operation, with the spatially-separated antennas arranged to provide high isolation there between. It is also known that radar systems may use high-end circulators to reduce the interference effects.

Isolation to minimise cross-talk may therefore be achieved at high frequencies using high-end circulators or rat-race couplers 150, located between transmit and receive paths. A rat-race coupler 150 would typically provide less than 20 dB isolation between the two paths. Thus, for example, a radar transmit signal of 16 dBm at 77 GHz input to a rat-race coupler of 20 dB isolation would still leak −4 dBm of transmit signal 152 into the receiver chain. This level of leakage power will be significantly more than the desired receive signal. Hence, a significant portion of the transmitted signal couples into the receiving channel/circuitry. This undesired transmitted signal acts as an additional, unwanted signal in the receiver down-mixer circuitry, thereby creating further undesired down-converted signals in the intermediate or low-frequency/baseband circuitry that degrades the complete system performance.

High frequency mixer circuits are often based on the known Gilbert cell type. The Gilbert cell type is an active mixer that provides a conversion gain instead of conversion loss. However, the linearity of such active mixers is known to be limited. Thus, in a mono-static radar system, where the signal leakage may easily exceed −4 dBm, the mixer should still be able to operate in a linear mode with such a high leakage level. To achieve this level of linearity, the input referred 1-dB compression point, which is a measure for the linearity of the receiver, must be designed with sufficient margin compared to the maximum input power. As a rule of thumb, the compression point is calculated as: 10 dB plus the maximum power level. Thus, in the above example when the leakage level is −4 dBm, the desired 1-dB compression point is in the region of +6 dBm. Hence, the design of such extremely linear mixer cores requires high supply voltages and extremely high current densities in the transistors. As active Gilbert-cell mixers cannot support this combination of competing system parameters, a trade-off is often made, for example the output power of the transmitter is often reduced to lower the cross-coupled leakage into the receiver path. However, a lower transmitted power will reduce the signal-to-noise ratio (SNR) of the system, which in turn degrades the system performance. To overcome this problem, the cross-coupled signal into the receiver needs to be cancelled using an alternative approach.

In addition, the phase effects of radio frequency (RF) circuits, such as the Gilbert cell mixers, are difficult to be compensated for as implementing controllable phase shifter technology at such high frequencies is generally practically unrealizable due to cost, size and/or isolation performance constraints.

SUMMARY OF THE INVENTION

The present invention provides an integrated circuit, a communication unit and method for phase compensation as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

FIG. 1 schematically illustrates known causes of interference effects in a high frequency communication unit.

DETAILED DESCRIPTION

Figure 2:
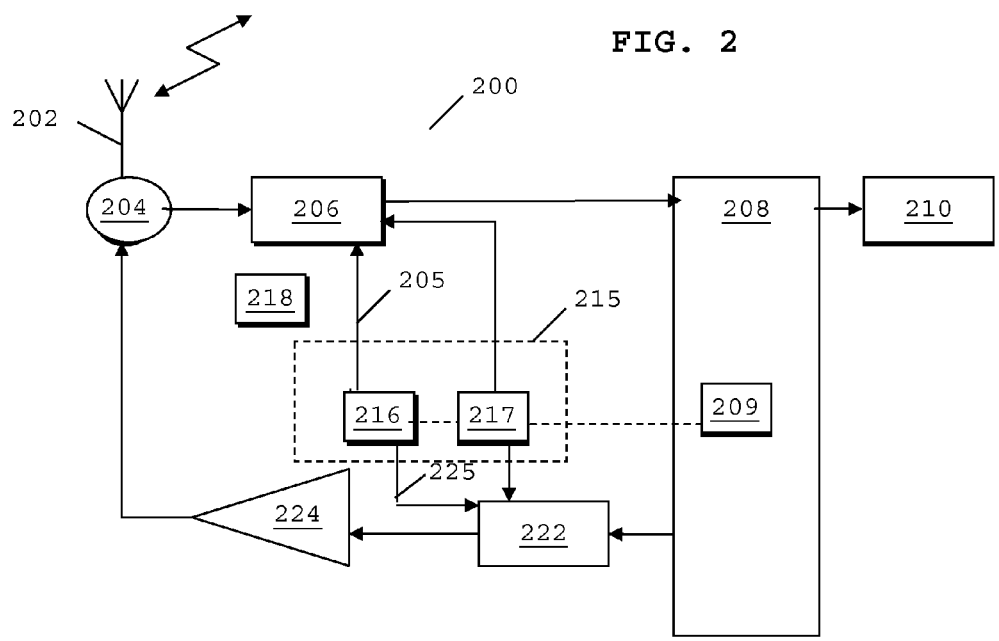
FIG. 2 illustrates a block diagram of an example of a high frequency communication unit.

As explained below in more detail, in the illustrated examples, an electrically adjustable phase shifter is implemented by adaptive electrical adjustment of an effective length of a transmission line. In the following example, the electrically adjustable phase shifter may be implemented in a communication unit for use in a frequency modulated constant wave (FMCW) radar system, such as a mono-static radar system. However, the example of a use in a mono-static radar system is just one of many example applications. The electrically adjustable phase shifter may be implemented in any communication unit or system that employs an active mixer (e.g. an up/down frequency conversion circuit or device) where DC offset, namely DC balance between the differential intermediate frequency (IF) outputs, is a problem. For example, the electrically adjustable phase shifter may be implemented in any high frequency heterodyne or homodyne system or communication unit where the down-converted IF may be considered as being relatively close to DC, with respect to the high operating frequency of the communication unit, for example where the IF is less than 0.01% of the high frequency. Such examples may include any IF frequency, especially including zero IF (equating to DC).

As explained below in more detail, in the shown examples, the adaptive electrically adjustable phase shifter is arranged to adjust the phase-shift of signals at high (e.g. many GHz) frequencies, where existing implementations are too complex to realize or consume too much power. The example of the adaptive electrically adjustable phase shifter may be realized using one or more amplifier stages, which adjusts the effective length of a transmission line and thereby the phase of the signal that is being transferred via the transmission line, by inserting or by-passing discrete transmission line segments in response to control by respective amplifier stages.

In the following, a mechanism is described for phase compensating a local oscillator signal to be applied to a receiver/transmitter chain in a frequency conversion operation, as an example. However, the same technique may be used to adjust a phase in any high frequency radio frequency path, for example a radio frequency receiver and/or transmitter path.

Before describing in detail particular examples, it should be observed that the apparatus, components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

Referring now to FIG. 2, a simplified block diagram of an example of a high frequency communication unit 200 is shown. In practice, purely for the purposes of explaining embodiments of the invention, the high frequency communication unit is described in terms of a mono-static radar communication unit 200, although the functional elements are recognized as being similar or equivalent to those found in most wireless communication units. The high frequency communication unit 200 contains an antenna 202, which in this example is operably coupled to a rat race coupler 204 that provides isolation between receive and transmit chains within the high frequency communication unit 200.

The receiver chain, as known in the art, includes receiver front-end circuitry 206 (effectively providing one or more of the following functions: signal reception, signal amplification, signal filtering and down conversion of the received high frequency signal to an intermediate frequency or base-band frequency signal). The front-end circuitry 206 is serially coupled to signal processing logic 208. An output from the signal processing logic 208 is provided to a suitable output device 210. In a vehicle radar application, examples of the output device 210 may comprise an indication on a vehicle dashboard or electro-mechanical braking equipment to potentially instigate emergency braking, or a separate air-bag controller circuitry when performing pre-cash detection, etc.

A controller 217 maintains overall control of the high frequency communication unit 200. The controller 217 is also coupled to the receiver front-end circuitry 206 and the signal processing logic 208 (generally realized by a digital signal processor (DSP)). The controller 217 may also be coupled to a timer 218 arranged to control the timing of operations (transmission or reception of time-dependent signals) within the high frequency communication unit 200.

As regards the transmit chain, this essentially comprises transmitter/modulation circuitry 222 and a high frequency power amplifier 224 coupled to the antenna 202 via the rat race coupler 204. The transmitter/modulation circuitry 222 and the power amplifier 224 may be operationally responsive to the controller 217.

The signal processor logic 208 in the transmit chain may be implemented as distinct from the processor in the receive chain. Alternatively, a single processor 208 may be used to process both transmit and receive signals, as shown in FIG. 2. Clearly, the various components within the high frequency communication unit 200 can be realized in discrete or integrated component form, with an ultimate structure therefore being application-specific or purely a design selection.

In this example, the high frequency communication unit 200 comprises a frequency generation circuit 216 that is operably coupled to both of the transmitter/modulation circuitry 222 in the transmitter chain and the front-end circuitry 206 in the receiver chain. The frequency generation circuit 216 is arranged to provide phase compensated local oscillator signals to either, or both, of the transmitter/modulation circuitry 222 and the front-end circuitry 206. The frequency generation circuit 216 may comprise (or be operably coupled to) a frequency generation source, such as a crystal oscillator (hereinafter referred to as a local oscillator (LO)). The LO may be operably coupled to an adaptive electrically adjustable phase shifter, which may be implemented by electrically adjusting an effective length of a transmission line. The operation and function of the frequency generation circuit 216, together with the adaptive electrically adjustable phase shifter, is described further in the operational description below.

In the above example, the frequency generation circuit 216 and the controller 217 may be formed within the same integrated circuit (IC) package 215. In other examples, the frequency generation circuit 216 and the controller 217 may be formed within separate or distinct IC packages or as separate lumped elements or circuits. In other examples, the frequency generation circuit 216 and/or the controller 217 may be formed within the same IC package as a portion of, or encompassing all of, the transmitter/modulation circuitry 222 and/or front-end circuitry 206, for example by encompassing the up-mixing and/or down-mixing elements or circuits (not shown).

Figure 3:
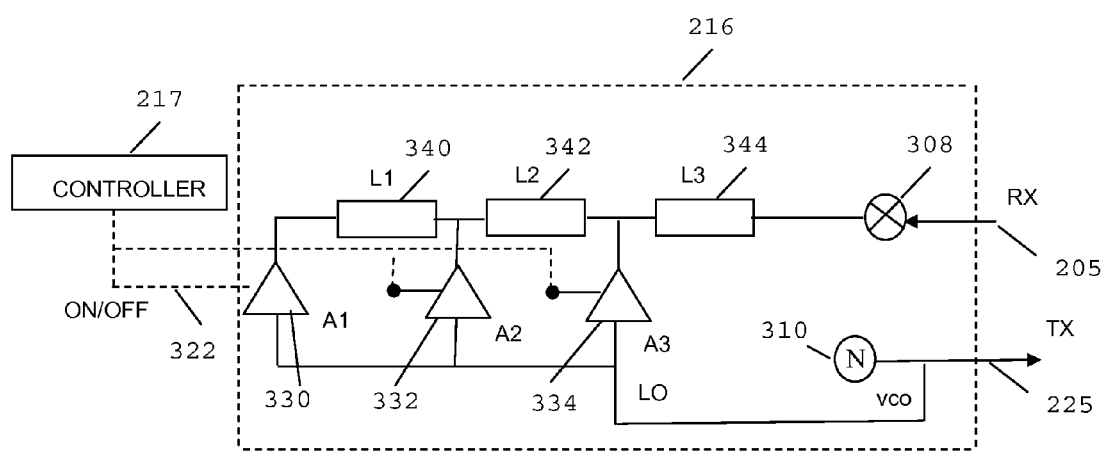
FIG. 3 illustrates a block diagram of a more detailed example of a high frequency communication unit circuit.

Referring now to FIG. 3, a block diagram of a more detailed example of the frequency generation circuit 216 is illustrated. The frequency generation circuit 216 comprises a frequency generation source 310, for example in a form of a fractional-N synthesizer based local oscillator, which is arranged to provide a high frequency signal 225 to a transmit chain. In the illustrated example, the frequency generation source 310 is operably coupled to respective inputs of a series of amplifier stages 330, 332, 334, with three amplifier stages being shown for clarity purposes only. The operational status of each of the series of amplifier stages 330, 332, 334 is controlled by controller 217, such that the controller 217 is able to individually turn each amplifier stage 'on' or 'off' via control signals 322. In this manner, by controlling the operation of each of the individual amplifier stages 330, 332, 334, the controller 217 is able to individually and selectively switch in/out certain transmission line lengths 340, 342, 344 that form the LO path to the receiver down-conversion mixer stage 308.

Thus, as an example, the controller may selectively turn 'on' amplifier A1 330. In this example, all other amplifier stages may be turned 'off'. The LO signal provided by the frequency generation source 310 is, thus, re-routed and amplified by amplifier stage A1, 330, and then fed via each of the transmission line segments L1 up to Ln to the receiver down-conversion mixer stage 308. The effective length of the transmission line is then approximately a sum of each of the transmission line lengths (L1, L2, . . . , Ln). If it is determined that the phase shift between the transmit path and the receive path needs to be adjusted, in this example, the controller 217 may then re-configure the operation of the series of amplifier stages 330, 332, 334. For example, in order to reduce the phase shift differential, the effective length of the transmission line must be reduced. In this case, the controller 217 may turn 'on' amplifier A2, 332, and turn 'off' amplifier A1, 330. Again, all the other amplifier stages may remain, or be turned, 'off'. Now, the effective length of the transmission line is approximately the sum of each of a reduced number of transmission line lengths, namely a sum of L2, L3, . . . , Ln, thereby resulting in a lower phase shift being applied to the receiver down-conversion mixer stage 308. Thus, in this manner, the controller 217 is able to selectively insert or remove transmission line lengths, from a plurality of selectable transmission line lengths coupled in series, and arranged to carry the LO signal to be used, for example, in the receiver chain.

The amplifier stages may be designed and realized within different technologies, such as common-emitter, common-source, or cascode stages. By enabling or disabling discrete amplifier segments, the length of an effective transmission line is modified and in this way the phase shift caused by the effective transmission line is adjusted. Furthermore, in different example implementations, the amplifier stages may be designed and realized using single-ended amplifier stages or differential amplifier stages.

Figure 4:
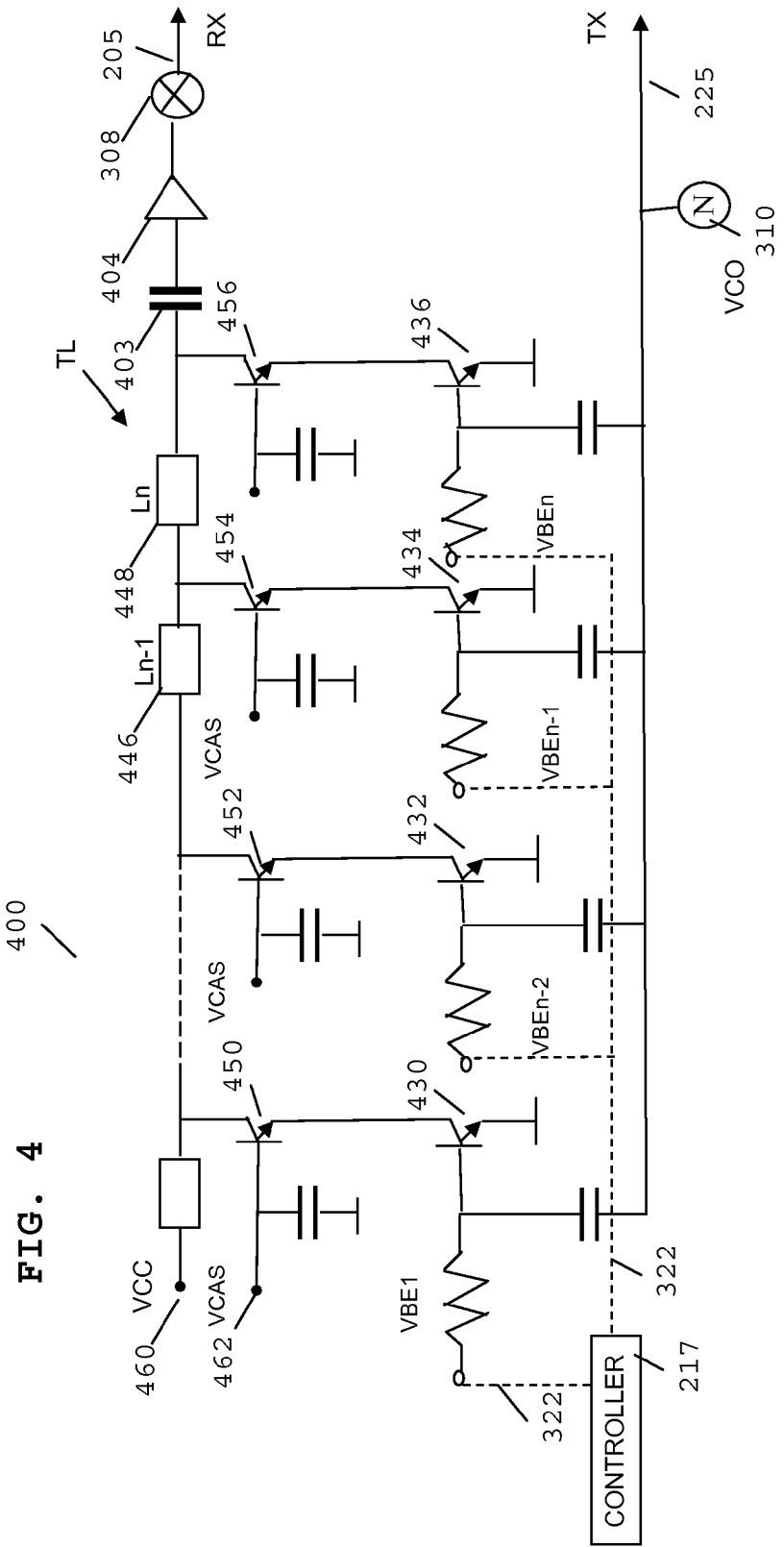
FIG. 4 illustrates a circuit diagram of an example of a high frequency communication unit circuit.

Referring now to FIG. 4, a more detailed example of a high frequency communication unit circuit 400, based on cascode amplifiers and realized with heterojunction bipolar transistors (HBTs), is illustrated. The HBT is an improvement of the bipolar junction transistor (BJT), which is able to handle signals of very high frequencies, for example up to several hundred GHz.

The high frequency communication unit circuit 400 comprises a frequency generation source 310, for example in a form of a fractional-N synthesizer local oscillator, which is arranged to provide a high frequency signal 225 to a transmit chain. In the illustrated example, the frequency generation source 310 is operably coupled to respective inputs of a series of amplifier stages 430, 432, 434, 436 represented by a simple one stage cascode amplifier stage for clarity purposes only. The series of amplifier stages 430, 432, 434, 436 are controlled by controller 217, such that the controller 217 is able to individually turn each amplifier stage 'on' or off via control signals 322. In this manner, by controlling the operation of the individual amplifier stages 430, 432, 434, 436 the controller 217 is able to individually and selectively switch in/out certain transmission line lengths 446, 448. The selectable transmission line lengths 446, 448 are operably coupled to the receiver down-mixer 308 via de-coupling capacitor 403 and a low noise amplifier stage 404.

The high frequency communication unit circuit 400 comprises a frequency generation source 310, for example in a form of a fractional-N synthesizer local oscillator, which is arranged to provide a high frequency signal 225 to a transmit chain. In the illustrated example, the frequency generation source 310 is operably coupled to respective inputs of a series of amplifier stages 430, 432, 434, 436. The series of amplifier stages 430, 432, 434, 436 is controlled by controller 217, such that the controller 217 is able to individually turn each amplifier stage 'on' or 'off' via control signals 322. To turn 'on' a respective amplifier stage, only the control voltage (Vbe) of each respective amplifier stage 430, 432, 434, 436 must be applied via the corresponding input resistor. Typically, if the controller 217 applies a control voltage to the HBT base Vbe1 that is greater than the on-voltage of the corresponding base-emitter diode of the HBT, the respective HBT amplifier stage will be enabled. Conversely, if the controller applies a control voltage to the HBT base Vbe1 that is less than the on-voltage of the corresponding base-emitter diode of the HBT, the respective HBT amplifier stage will be disabled. The collector voltage of each of the respective individual amplifier stages 430, 432, 434, 436 is, thus, set by the emitter of respective cascode amplifier stages 450, 452, 454, 456. as supplied by the cascode voltage VCAS 462 and the supply voltage VCC 460. In this manner, by controlling the operation of the individual amplifier stages 430, 432, 434, 436, the controller 217 is able to individually and selectively switch in/out certain transmission line lengths 446, 448 that form the LO path to the receiver down-conversion mixer stage 308.

Thus, as an example, the controller 217 may selectively turn 'on' first HBT amplifier stage 430 and turn 'off' all other amplifier stages. The LO signal provided by the frequency generation source 310 is, thus, re-routed and amplified by first HBT amplifier stage 430, and then fed via each of the transmission line segments up to Ln to the receiver down-conversion mixer stage 308. The effective length of the transmission line is then approximately the sum of each of the transmission line lengths (L1, L2, ..., Ln). If it is determined that the phase shift between the transmit path and the receive path needs to be adjusted, in this example, the controller 217 may then re-configure the operation of the amplifier stages 430, 432, 434, 436. For example, in order to reduce the phase shift differential, the effective length of the transmission line must be reduced. In this case, the controller 217 may turn 'on' the penultimate HBT amplifier stage 434, and may turn 'off' the first HBT amplifier 430. Again, all the other HBT amplifier stages may remain, or be, turned 'off'. Now, the effective length of the transmission line is approximately the sum of each of a reduced number of transmission line lengths, namely a sum of Ln−1 and Ln, thereby resulting in a significantly lower phase shift being applied to the receiver down-conversion mixer stage 308. Thus, in this manner, the controller 217 is able to selectively insert or remove any number of transmission line lengths, from a plurality of selectable transmission line lengths coupled in series, and arranged to carry the LO signal to be used, for example, in the receiver chain.

Referring back to FIG. 2, in the following example, the signal processing logic 208 may comprise, or be operably coupled to, DC offset determination logic 209. The DC offset determination logic 209 is arranged to measure any DC offset and/or imbalance in the received, differential IF (or baseband) signal. Thus, if the phase is not correctly adjusted, a DC offset or DC imbalance, is measured by DC offset determination logic 209. Any DC offset will cause an imbalance of the receiver down-mixer operation, and may thus strongly degrade the noise performance of the receiver, as the noise figure of the receiver down-mixer is directly correlated with the DC offset of the IF (or baseband) signals. In this example, if the DC offset determination logic 209 determines that a DC offset of the IF (or baseband) signals exists, the DC offset determination logic 209 informs the controller 217 of this fact. In response thereto, the controller 217 may re-configure the operation of individual amplifiers stages, as described above with respect to FIG. 3 or FIG. 4. By re-configuring the operation of respective amplifiers stages, the phase of the IF (or baseband) signals may be accordingly adjusted by selective inclusion or removal of the corresponding transmission line lengths, as described above.

In one example, the DC offset determination logic 209 may take the form of an analogue-to-digital converter (ADC), which may be located at the output of an IF stage. This ADC signal may then be input to the controller 217 and used by the controller 217 to select the correct equivalent transmission line length to minimize the DC offset.

In the above examples, the noise performance of the receiver system can be significantly improved, both generally and when the high frequency communication unit is operating in compression. Using such actively controlled compensation techniques, the requirements on the active mixer core can be drastically reduced, thereby resulting in lower total power consumption and significantly improved system signal-to-noise ratio (SNR) performance. Thus, an active real-time feedback system is provided, which will automatically adjust the phase of an RF signal based on the signal-to-noise ratio (SNR) of the down-converted IF signal. In one example implementation, for example using the aforementioned ADC, the control of the phase compensation may be achieved in a fully digital domain. Furthermore, the aforementioned examples may be applied to any RF operating frequency, and thereafter any IF or baseband frequency.

In the above examples, equal length transmission lines are used to provide equal phase shifts to be used and summed in the phase compensation process. However, in other examples, unequal length transmission lines may be used to sum a plurality of unequal phase shifts, thereby allowing a more accurate phase adjustment. Thus, the respective transmission line lengths may be arranged to be different and may be designed dependent upon the intended application, frequency of operation and/or the typical phase mismatching that may occur.

In the above examples, a limited number of transmission lines and corresponding number of amplifier stages are used. However, in other examples, any number from one to many tens of transmission lines and corresponding amplifier stages may be used, dependent upon the accuracy of the phase compensation that is required. In one example, one or more of the individual transmission lines may be replaced by lumped inductors and/or filter circuits or equivalents thereof, so long as in isolation or in any combination they provide an equivalent phase shift at the particular operating frequency.

In the above examples, the phase compensation is applied to an LO signal to be multiplied with a receive signal or a transmit signal in a corresponding up-mixer/down-mixer stage. However, as mentioned previously, in other examples the phase compensation may be applied directly to the RF path in the receiver and/or transmitter chain. When applied to the RF path, a passive coupler may be used to combine both signals. In this way, the unwanted, cross-coupled leakage may be canceled directly at the RF input of the active mixer core. The cancellation may be achieved by adding to signals in a 'destructive' mode.

As an example: the unwanted signal shows an amplitude 'A0' and a phase 'P0', so that the signal can be described as $A0 \angle P0$. If a signal with the amplitude 'A1' and the phase 'P1' (i.e. $A1 \angle P1$) is derived from the local oscillator and added to the cross-coupled signal, a cancellation of the unwanted $A0 \angle P0$ signal can be achieved by adjusting the amplitude 'A1' and the phase 'P1' of the derived signal. To adjust the phase P1 of the signal, the phase compensation examples hereinbefore described may be used. The amplitude may be adjusted, in one example, by a variable gain amplifier. If the amplitude A1 is approximately identical to the amplitude A0 and if the phase P1 is complementary to the phase P0 ($\angle P1 \sim \angle P0 +/- 180°$), the unwanted, cross-coupled signal may thus be substantially canceled. This combining operation may add some more losses in the transmit path and may increase the noise on the receive path, which may need to be taken into consideration in the circuit design. For example, if a (passive) Wilkinson divider is used to combine both signals, theory indicates that 3 dB noise will be added in the receive path and the output power of the transmit path will drop by 3 dB.

In the above examples, the example circuit diagram of a high frequency communication unit circuit utilises a rat-race coupler. In other examples, the coupler may take a form of a directional coupler (which is particularly useful when using GaAs substrates), a Wilkinson Divider, a Branch-Line coupler or a Lange-Coupler, etc.

Figure 5:
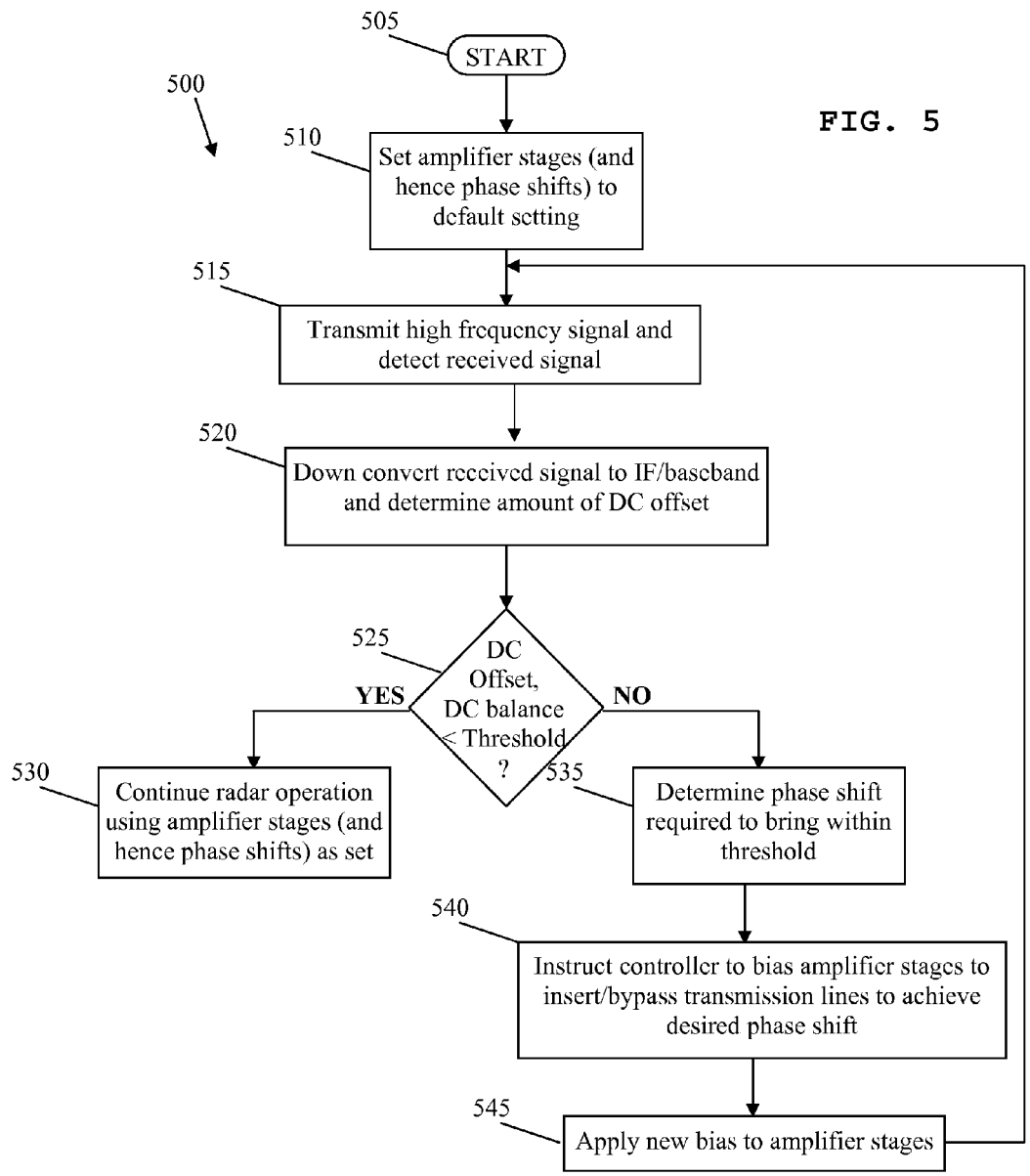
FIG. 5 illustrates a flowchart of an example phase compensation process employed in a high frequency communication unit.

Referring now to FIG. 5, a flowchart 500 illustrates an example phase compensation process employed in a high frequency communication unit. The phase compensation process adjusts a phase of a frequency-dependent signal by electrically adjusting an effective transmission line length that routes the frequency-dependent signal. The effective transmission line length is adjusted by electrically inserting or by-passing particular transmission lines. After commencing in step 505, for example due to turn 'on' of the radar communication unit, the controller sets a bias level for a series of amplifier stages associated with the respective transmission lines to route the frequency-dependent signal, as shown in step 510. For example, the series of amplifier stages may control the routing (for example by inserting or by-passing particular transmission lines) of a local oscillator signal to either the receiver and/or transmitter chains of the radar communication unit. By inserting or by-passing particular transmission lines the effective transmission line length is electrically adjusted, and thereby a phase shift applied to the frequency-dependent signal is also adjusted. The controller may initially set the bias level for the series of amplifier stages using default settings.

A high frequency signal is then transmitted from the radar communication unit and the reflected high frequency signal detected, as in step 515. The detected high frequency signal is then down-converted to an intermediate frequency (IF) or baseband signal and processed to determine the amount, if any, of DC offset and/or DC imbalance in the IF or baseband signal, as shown in step 520. A determination is made as to whether the DC offset is below a threshold level in step 525. If the DC offset is determined as being below the threshold level in step 525, it is assumed that the phase of the detected received high frequency signal requires no phase shift, and radar operation is continued using the amplifier stages as previously set.

If the DC offset is determined as not being below the threshold level in step 525, it is assumed that the phase of the detected received high frequency signal requires a phase shift. Thus, based on the determined DC offset, a determination is made as to how much phase shift is required to be applied to the received high frequency signal to bring the DC offset within the threshold, as shown in step 535. The controller is then instructed of this desired phase shift and accordingly biases the amplifier stages to insert/by-pass particular transmission lines to achieve the desired phase shift, as in step 540. The controller implements this new bias to the respective amplifier stages in step 545 and the process loops back to step 515 to determine whether the DC offset may now be determined as being below the threshold for subsequent transmission/reception of high frequency signals.

Figure 6:
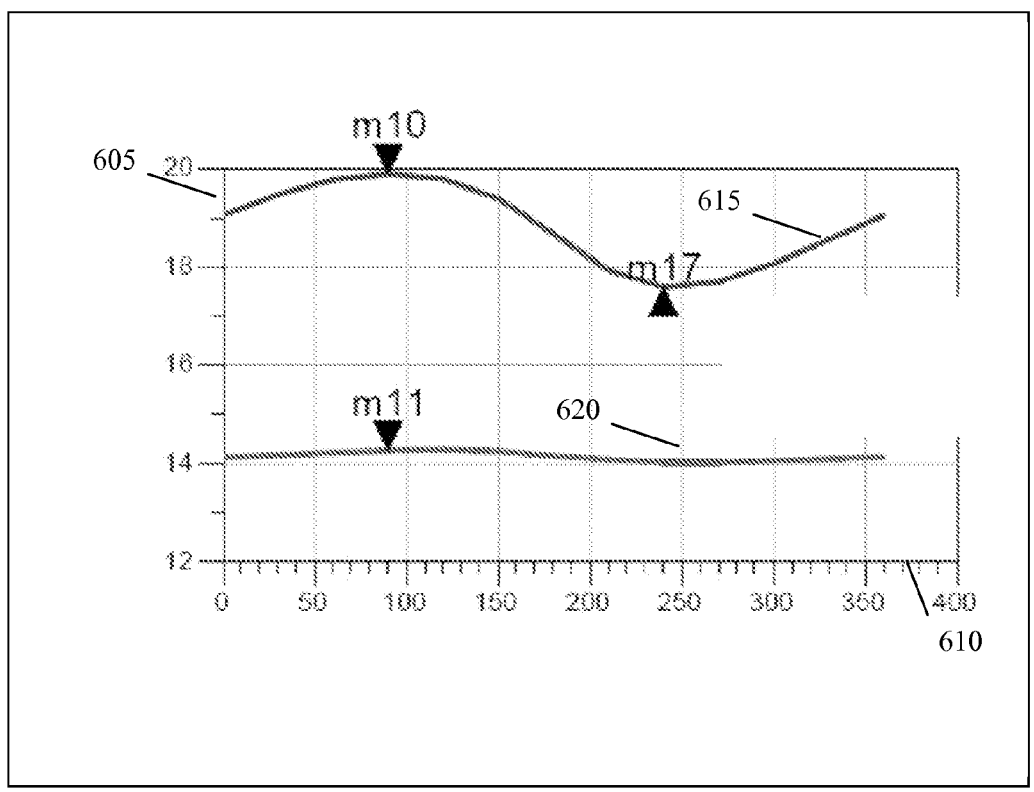
FIG. 6 illustrates an example of a graphical representation showing phase compensation of a local oscillator signal of FIG. 3 or FIG. 4.

Referring now to FIG. 6, an example of a graphical representation 600 showing phase compensation of a local oscillator signal of FIG. 3 or FIG. 4 is illustrated. The graphical representation 600 illustrates a conversion gain waveform 620 and a noise figure waveform 615 in dB, versus a phase of the LO signal following phase compensation as previously described.

It will be understood that the examples of a high frequency communication unit, integrated circuit and method for electrically adjusting an effective transmission line length by adaptively and electrically inserting/by-passing particular transmission lines in a high frequency communication unit, as described above, may enable a communication unit to improve phase control of the signals routed therein. In addition, the examples may improve a noise performance of the receiver system, both generally and when the high frequency communication unit is in compression. Furthermore, the examples may provide an active feedback system that may adjust the phase automatically, based on the SNR of the IF signal. Moreover, the examples may support a phase control implementation that is fully digitally controlled.

Those skilled in the art will realize that the above recognized advantages and other advantages described herein are merely exemplary and that the invention does not require all of these advantages to be obtained.

It will be appreciated that the examples described herein may be comprised of one or more generic or specialized processors (or 'signal processors') such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for performing power control described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a 'signal processor' for purposes of the foregoing discussion and claim language.

Moreover, an embodiment of the invention can be implemented as a computer-readable storage element having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the invention have been described. However, one of ordinary skill in the art appreciates that various modifications and changes can be made without departing from the scope of the invention as set forth in the claims below.

Accordingly, the specification and figures are to be regarded in an illustrative rather than a restrictive sense, and all such modifications are intended to be included within the scope of invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the prosecution of this application and all equivalents of those claims as issued.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Moreover in this document, relational terms such as first and second, top and bottom, and the like may be used solely to distinguish one entity or action from another entity or action without necessarily requiring or implying any actual such relationship or order between such entities or actions.

The terms 'comprises', 'comprising', 'has', 'having', 'includes', 'including', 'contains', 'containing' or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by 'comprises . . . a', 'has . . . a', 'includes . . . a', 'contains . . . a' does not, without more constraints, preclude the existence of additional identical elements in the process, method, article, or apparatus that comprises, has, includes, contains the element. The terms 'a' and 'an' are defined as one or more, unless explicitly stated otherwise herein.

The terms 'substantially', 'essentially', 'approximately', 'about' or any other version thereof, are defined as being close to as understood by one of ordinary skill in the art. The term 'coupled' as used herein is defined as connected, although not necessarily directly and not necessarily mechanically. A device or structure that is 'configured' in a certain way is configured in at least that way, but may also be configured in ways that are not listed.

The invention claimed is:

1. A communication unit comprising:
   a controller;
   a radio frequency signal path having a plurality of delay elements operably coupled to a series of respective amplifier stages;
   wherein the controller is arranged to individually enable the respective amplifier stages and in response thereto a number of the plurality of delay elements are selectively inserted into or by-passed from the radio frequency signal path thereby adjusting a phase shift applied to signals provided through the radio frequency signal path.

2. The communication unit of claim 1 wherein the plurality of delay elements comprise a number of a plurality of respective transmission lines.

3. The communication unit of claim 2 wherein the plurality of respective transmission lines are connected in series.

4. The communication unit of claim 3 wherein unequal length transmission lines are used to provide respective unequal phase shifts that are selectively introduced by the controller enabling individual amplifier stages.

5. The communication unit of claim 3 wherein the communication unit further comprises an active real-time feedback circuit operably coupled to the controller and arranged to provide an indication to the controller of a phase shift applied to signals provided through the radio frequency signal path.

6. The communication unit of claim 3 wherein the communication unit comprises a frequency generation circuit for generating a local oscillator (LO) signal such that a number of the plurality of delay elements are selectively inserted into or by-passed from the radio frequency signal path carrying the LO signal.

7. The communication unit of claim 2 wherein the number of the plurality of respective transmission lines are inserted into the radio frequency signal path adjust an effective length of the transmission lines used in the radio frequency signal path.

8. The communication unit of claim 2 wherein unequal length transmission lines are used to provide respective unequal phase shifts that are selectively introduced by the controller enabling individual amplifier stages.

9. The communication unit of claim 2 wherein the communication unit further comprises a transmitter for transmitting a first high frequency signal such that a number of the plurality of delay elements are selectively inserted into or by-passed from the radio frequency signal path carrying the first high frequency signal.

10. The communication unit of claim 1 wherein the communication unit further comprises an active real-time feedback circuit operably coupled to the controller and arranged to provide an indication to the controller of a phase shift applied to signals provided through the radio frequency signal path.

11. The communication unit of claim 10 wherein the active real-time feedback circuit comprises DC offset determination logic operably coupled to the controller and arranged to compare a DC offset of the received, down-converted signal with a threshold.

12. The communication unit of claim 11 wherein the active real-time feedback circuit is implemented in a digital form such that phase compensation is performed in a fully digital domain.

13. The communication unit of claim 10 wherein the active real-time feedback circuit is implemented in a digital form such that phase compensation is performed in a fully digital domain.

14. The communication unit of claim 1 wherein the communication unit comprises a frequency generation circuit for generating a local oscillator (LO) signal such that a number of the plurality of delay elements are selectively inserted into or by-passed from the radio frequency signal path carrying the LO signal.

15. The communication unit of claim 1 wherein the communication unit further comprises a transmitter for transmitting a first high frequency signal such that a number of the plurality of delay elements are selectively inserted into or by-passed from the radio frequency signal path carrying the first high frequency signal.

16. The communication unit of claim 1 wherein the communication unit further comprises a receiver for receiving a second high frequency signal, such that a number of the plurality of delay elements are selectively inserted into or by-passed from the radio frequency signal path carrying the second high frequency signal.

17. The communication unit of claim 1 adapted to operate in a mono-static radar system.

18. An integrated circuit for a communication unit comprising:
   a controller;
   a radio frequency signal path having a plurality of delay elements operably coupled to a series of respective amplifier stages;
   wherein the controller is arranged to individually enable the respective amplifier stages and in response thereto a number of the plurality of delay elements are selectively inserted into or by-passed from the radio frequency signal path thereby adjusting a phase shift applied to signals provided through the radio frequency signal path.

19. A method for compensating a phase of signals in a communication unit comprising a controller and a radio frequency signal path having a plurality of delay elements operably coupled to a series of respective amplifier stages, wherein the method comprises:
   individually enabling the respective amplifier stages, and in response thereto either:
   selectively inserting a number of the plurality of delay elements into the radio frequency signal path; or
   selectively by-passing a number of the plurality of delay elements from the radio frequency signal path;
   thereby adjusting a phase shift applied to signals provided through the radio frequency signal path.

20. The method of claim 19 wherein the delay elements comprise unequal delay elements configurable to provide unequal phase shifts.

* * * * *